(12) United States Patent
Lin

(10) Patent No.: US 7,874,258 B2
(45) Date of Patent: Jan. 25, 2011

(54) METHOD OF REDUCING FRICTIONAL RESISTANCE BETWEEN SHIP BODY AND WATER BY RELEASING GASES IN WATER

(76) Inventor: Zuei-Ling Lin, 4F, No. 260, Sung Ho Street, Taipei City 10567 (TW)

( * ) Notice: Subject to any disclaimer, the term of this patent is extended or adjusted under 35 U.S.C. 154(b) by 457 days.

(21) Appl. No.: 12/149,185

(22) Filed: Apr. 29, 2008

(65) Prior Publication Data

US 2009/0266288 A1    Oct. 29, 2009

(51) Int. Cl.
*B63B 1/34* (2006.01)
*B63B 1/38* (2006.01)

(52) U.S. Cl. ................................... 114/67 A
(58) Field of Classification Search ............ 114/67 R, 114/67 A, 288–290
See application file for complete search history.

(56) References Cited

U.S. PATENT DOCUMENTS

| | | | | |
|---|---|---|---|---|
| 1,348,828 A | * | 8/1920 | Fessenden | 181/175 |
| 1,697,257 A | * | 1/1929 | Anissimoff | 114/67 A |
| 4,029,035 A | * | 6/1977 | German | 114/67 A |
| 5,575,232 A | * | 11/1996 | Kato et al. | 114/67 A |
| 6,186,085 B1 | * | 2/2001 | Kato et al. | 114/67 A |

FOREIGN PATENT DOCUMENTS

| | | | |
|---|---|---|---|
| JP | 61041685 A | * | 2/1986 |
| JP | 61081283 A | * | 4/1986 |
| JP | 61200081 A | * | 9/1986 |
| JP | 11198892 A | * | 7/1999 |
| JP | 11321775 A | * | 11/1999 |
| JP | 2000142555 A | * | 5/2000 |
| JP | 2003252284 A | * | 9/2003 |

* cited by examiner

*Primary Examiner*—Ajay Vasudeva
(74) *Attorney, Agent, or Firm*—Rosenberg, Klein & Lee

(57) ABSTRACT

A method of reducing frictional resistance between a ship hull and water by releasing gases through a plurality of gas outlets under a water level in a fore portion of the hull. The released gases are selected from a group of air, engine exhaust gas and water vapor. A heating device supplied with electric power is provided at a periphery of each gas outlet for producing the water vapor. The position of releasing the gases is selected according to parameters including the shape of the hull, the velocity, the draft depth and the water temperature, such that the released gases are floated to the water surface along predetermined flow lines on the hull.

5 Claims, 10 Drawing Sheets

METHOD OF REDUCING FRICTIONAL RESISTANCE BETWEEN SHIP BODY AND WATER BY RELEASING GASES IN WATER

BACKGROUND OF THE INVENTION

1. Field of the Invention

The present invention relates to a method of reducing frictional resistance between a ship body and water by releasing gases in water, and more particularly to a method of releasing gases at a predetermined position under the water level of a fore part of the ship body according to parameters such as the total length, velocity and draft depth of a ship to provide advantageous interferences to lower the average density ρ of water at the water surface in contact with the ship body, and the released gases at a high pressure zone can reduce the pressure of water to a hull and the suction of water to the hull in a low pressure zone to provide both functions simultaneously.

2. Description of the Related Art

In general, a vessel refers to a motive power ship, a warship, an aircraft carrier, a liner, a cargo ship, an oil tanker, a yacht, a waterjet, a model ship, a seaplane, a no-power oil drilling platform, and a barge, etc.

Different vessels come with different functions and body designs. For example, warships require a high velocity, and thus the warships are usually designed in a slender streamlined shape to reduce the carrying capacity and draft relatively. Merchant ships require a large carrying capacity and a high draft, and thus the merchant ships are usually designed in a broad shape, but such shape will reduce the velocity, since the resistance of water such as seawater and fresh water (both referring to "water") hinders the ships and retards the velocity.

Referring to FIGS. 1 to 3 for a perspective view, a side view and a top view of a liner 20 respectively, the commercial liner 20 generally comes with a length L of hundreds of meters (m), a beam width B of 60~70 m, and a draft depth D of 15~25 m depending on the load of the liner 20. Therefore, the large-sized merchant ships of this short have a large contact area with water. According to the principle of Fluid Mechanics, the friction drag FD can be calculated by the following equation:

$$F_D = C_D A \frac{1}{2} \rho U^2$$

wherein $C_D$ is the coefficient of drag;
A is the total area in contact with the fluid;
ρ is the fluid density;
U is the velocity (m/s).

For example, a hull 30 of the liner 20 of this embodiment is simulated as a slab in contact with seawater, and the slab comes with a length L of 360 m, a beam width B of 70 m, and a draft depth of D 25. If the liner 20 is traveling at a velocity of 13 knots in seawater at a temperature of 10° C., the Equation $$FD = CDA\frac{1}{2}\rho U2$$

can be used to calculate the friction drag at the surface of the hull 30. As described in a book "Introduction to Fluid Mechanics", Sixth Edition, authored by Professor Robert W. FOX, et al of Purdue University, the values of the aforementioned L, B, D and U can be used for calculating the value of FD, if the velocity is 13 knots (wherein a knot is equal to one nautical mile per hour). Therefore, Velocity U=13 nm/hr×6076 ft/nm×0.305 m/ft×hr/3600 s=6.69 m/s Further, the kinematic viscosity $v=1.37 \times 10^{-6}$ m²/s at a temperature of 10° C., and such kinematic viscosity and the data mentioned in Professor Fox's book can be used to obtain $C_D=0.00147$ and $\rho=1020$ kg/m³.

The hull 30 is in contact with an area having a length and a width such that W=B+2D of the seawater, and thus the total contact area A with the seawater=360 m×(70+50) m=43200 m².

From the equation above, $$F_D = C_D A \frac{1}{2} \rho U^2$$
$$= 0.00147 \times 43200 \ m^2 \times \frac{1}{2} \times 1020 \ kg/m^3 \times$$
$$(6.69)^2 \ m^2/s^2 \times N \cdot s^2/kg \cdot m$$

$$FD = 1.45 \ MN$$

The relative power is $$P = F_D U = 1.45 \times 10^6 \ N \times 6.69 \ m/s \times W \cdot s/N \cdot m$$

P=9.70 MW which is approximately equal to 13000 HP, and this data shows that the power required for overcoming the friction drag at the surface of the liner 20 is very large.

From the example above, we know that the resistance comes from the air, tire, and road surface when the ship is moving on land, and the resistance comes from the air resistance and the friction drag between the hull and water when the ship is moving in sea. With the same motive force, the speed of the ship traveling on land is faster than that traveling in sea, since the density of water is 1 at 20° C. and 1 atmospheric pressure, and the density of water is approximately 800 times of the density of air.

Therefore, manufacturers and designers in the related fields conduct extensive researches and attempt to reduce the friction drag $F_D$ between the hull and water. In some of the conventional methods, the reduction the friction drag between a hull and water is generally limited to the installation of a bulb bow and a foil, wherein the bulb bow is provided for reducing the resistance caused by a wave breaking and a reflection at the fore part, and the foil is provided for supporting and slightly lifting the ship body to reduce the water contact area with the ship body. However, such arrangement can be applied to small-sized vessels only. For example, a hovercraft requires a large quantity of air to support the hovercraft body, and thus the aforementioned arrangement can be applied to small-sized vessels only, since the density ρ of water cannot be decreased, and the friction drag between the hull and water, the pressure in a high pressure zone and the suction in a low pressure zone still exist.

In FIG. 3, a thin boundary layer is disposed between a range (a→b) from a fore part 31 of the hull 30 to a point c at the after part through the ship body and water. As far as there is a friction at the boundary layer, the drag still exists, such that an object will produce a track 32 of wakes as indicated by the line before the Point c in FIG. 3. Point c is a separation point, where fluid particles are separated from the object to produce a track, and form a wake 33 on the internal side of the Point c, which is the flow line from Point a to Point b and considered as a high pressure zone. Turbulence or a low pressure zone is formed in a small area behind the Point b, and the wake 33 behind the Point c forms a low pressure zone. Regardless of the pressure produced by water currents to the hull 30 in the high pressure zone and the suction produced by water currents to the hull 30 in the low pressure zone, both pressure and suction constitute a resistance to a forward movement of the ship, and thus it is necessary to overcome the pressure and suction to enhance the efficiency of the ship.

Another conventional way of reducing the friction drag applies a new technology to design the shape of the ship by computers and hydraulic experiments, so that interferences are produced to water waves, but such arrangement is effective in a range of velocities only, but the shape of the ship cannot changed to provide favorable interferences to the water waves according to different velocities, and thus the effect achieved by this conventional method is limited.

SUMMARY OF THE INVENTION

In view of the shortcoming of the conventional ship having an issue of water resistance, the inventor of the present invention conducted extensive researches and experiments, and finally invented a method of reducing frictional resistance between a ship body and water by releasing gases in water to overcome the shortcoming of the prior art.

It is a primary object of the invention to provide a method of reducing a frictional resistance between a ship body and water by releasing gases in water, and the method is based on the principle of the released gases rising vertically from the bottom and along an aslant wall of a hull, such that the rising gases can partially separate the hull from the water contact surface to reduce the average density of water at the contact surface, and the characteristics of the released gases rising vertically from the bottom and the compressibility of the gases serve as a buffer layer between the ship body for reducing the pressure of the water to the hull a low pressure zone, and reducing the suction to the hull at a low pressure zone, so as to achieve the effects of simultaneously reducing the pressure and suction while the ship is traveling Another object of the present invention is to provide a method of reducing the friction drag between a ship body and water by releasing gases in water, without the need of making any change to the shape of the ship body. Gas outlets are installed at predetermined positions of a fore part of the ship body for releasing gases, and the positions of releasing gases can be selected according to parameters such as the velocity and the draft depth of the ship, so that the gases can be released and attached onto a surface of the hull or rise to predetermined positions of the water surface according to predetermined flow lines to achieve the optimal effect of reducing the resistance or drag.

A further objective of the invention is to make use of the principle that the volume of the compressible gases is inversely proportional to the pressure. When the released gases rise from the bottom of the ship, the water pressure is decreased, the volume of the gases expands as the pressure of water increases. The volume of air bubbles rising from a depth of 30 m below the water surface to the water surface expands by approximately 4 times, and such characteristic is applied to large-sized vessels with a large displacement, and the released gases can achieve a better effect (or a better efficiency of several times) of reducing the frictional resistance or drag.

Still another object of the present invention is to use the effect of the gas released from the bottom of the ship rising to the water surface to reduce resistance, since the larger the curvature of the hull, the longer is the traveling distance of the gas rising from the bottom of the bottom to the water surface. By an appropriate design of the hull, we can improve the efficiency of reducing the resistance or drag.

Still a further object of the present invention is to release gases from the bottom or the fore part of the ship, such that the gases can rise close to the hull and along the aslant wall of the ship body, and the rising gases also provide the effects of cleaning the hull, reducing marine living organisms attached onto the ship body, and extending the time period for the next maintenance of the ship at a dockyard.

In order to achieve the above-mentioned objects, a method in accordance with the invention includes the steps of:

(a) providing a plurality of gas outlets disposed at predetermined positions under a water level of a fore part of a hull of the ship body for releasing the gases;

(b) using the effect of gases released vertically upward in the water and along an aslant wall of the hull to partially separate the hull from a water contact surface, so as to lower the average density of water at the contact surface with the hull;

(c) selecting the position of releasing the gases according to parameters including the shape of the hull, the velocity, the draft depth and the water temperature, such that the released gases are attached onto the surface of the hull and floated to predetermined positions of the water surface through predetermined flow lines; and (d) using the compressibility of the gases and the gases released in a high pressure zone and a low pressure zone as a buffer layer to reduce the pressure of water to the hull in the high pressure zone and reduce the suction to the hull in the low pressure zone, for simultaneously reducing the pressure and the suction produced during the traveling of the ship body, and the released gases having the same characteristics as described in Step (b). In this way, a faster velocity for a ship driven by the same motive power is ensured, thereby saving a substantial amount of fuel cost and reducing the production of carbon dioxide.

DETAILED DESCRIPTION OF THE PREFERRED EMBODIMENTS

Figure 1:
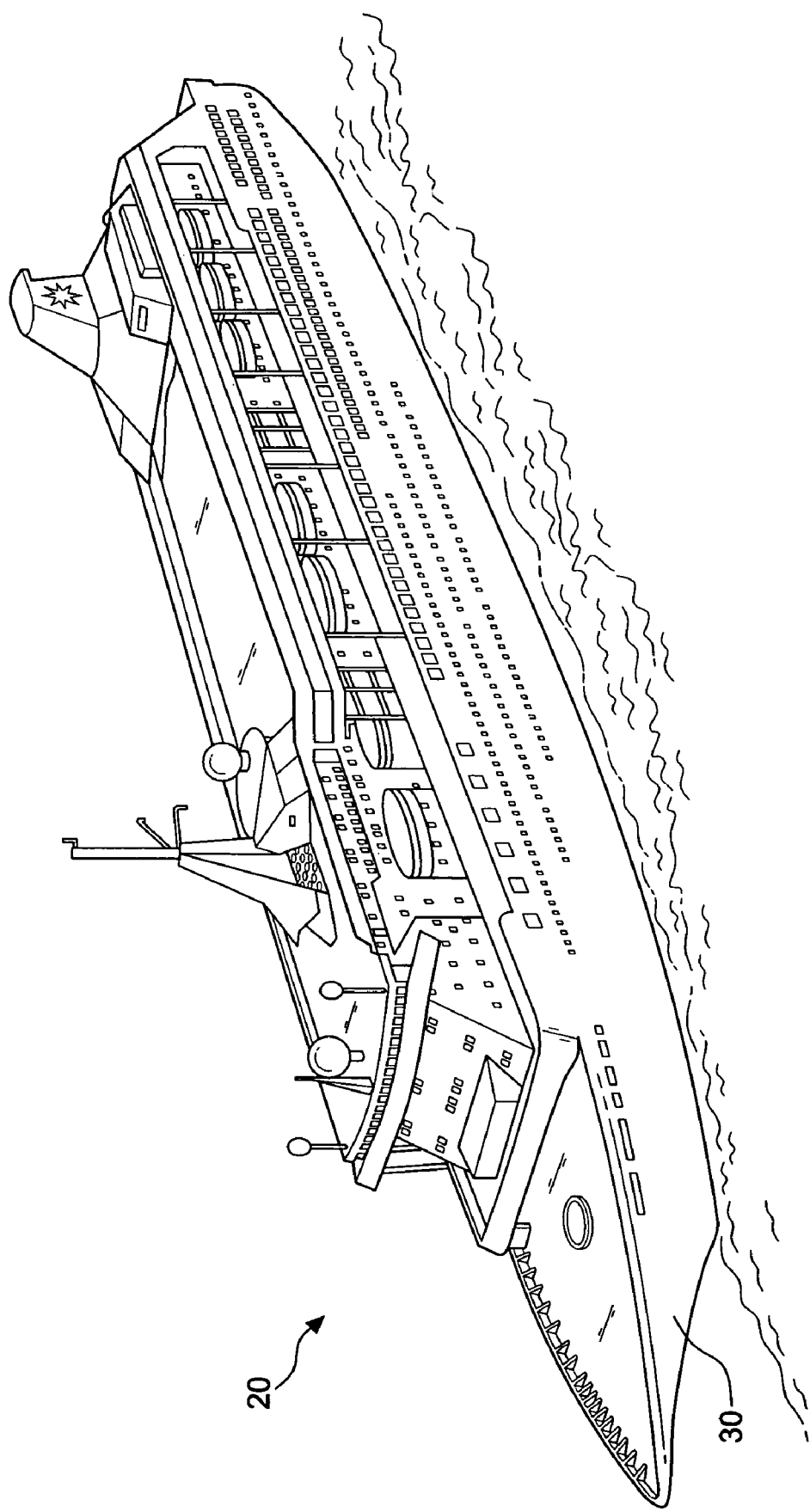
FIG. 1 is a perspective view of a conventional liner.
Figure 2:
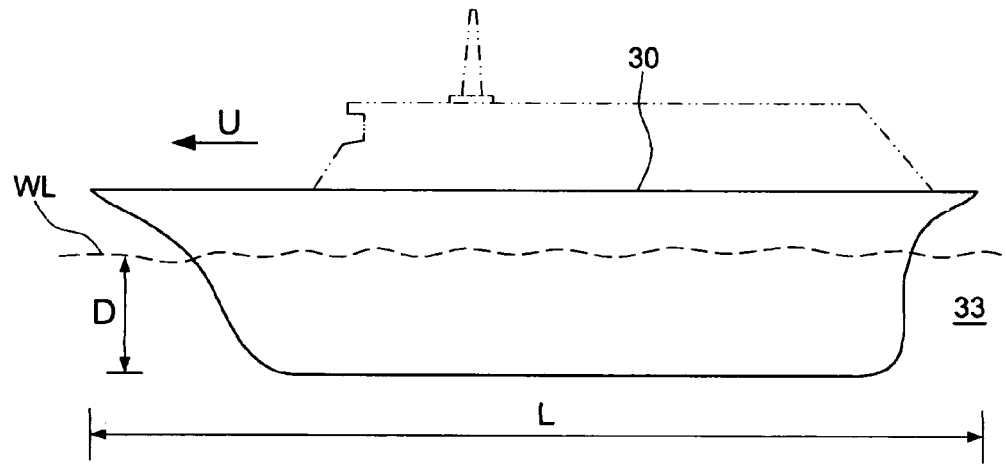
FIG. 2 is a side view of a conventional liner.
Figure 3:
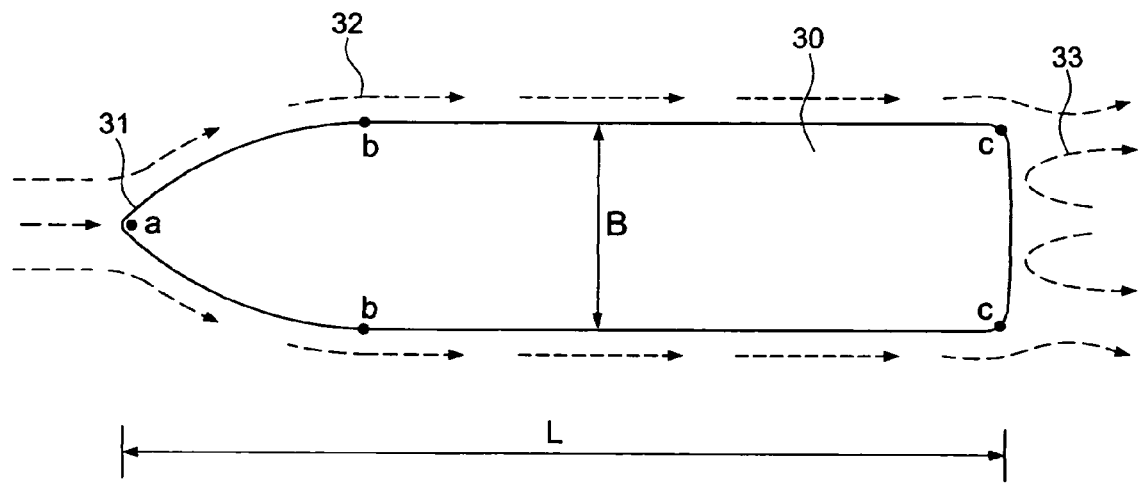
FIG. 3 is a top view of a conventional liner.
Figure 4:
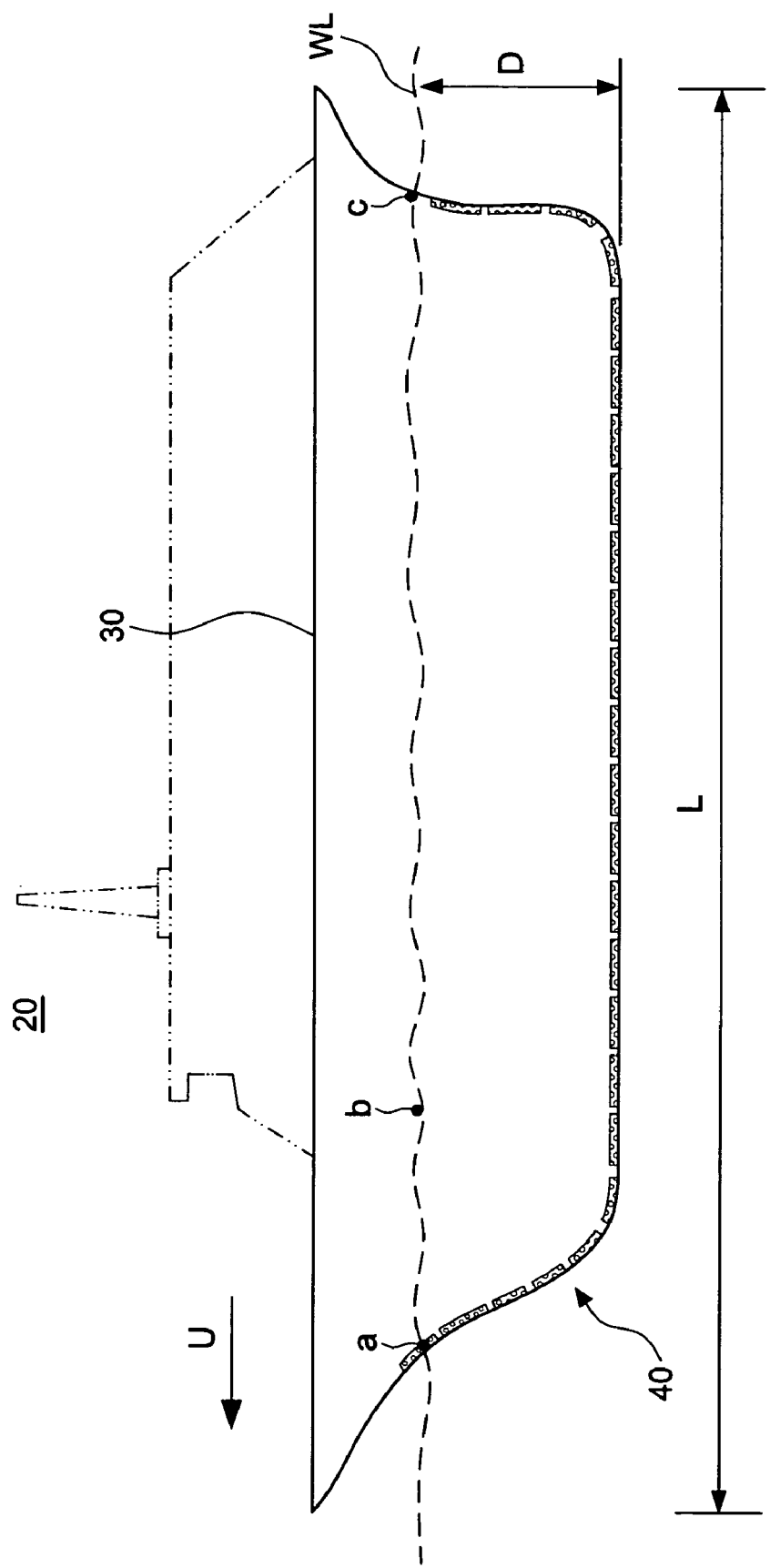
FIG. 4 is a side view of a hull in accordance with the present invention.

Referring to FIG. 4 for a plurality of gas outlets 40 disposed at predetermined positions under a water level WL of a fore part of a hull 30 of a ship body for releasing gases in accordance with a preferred embodiment of the present invention, the ship body is a liner 20 in this embodiment, but it can also be a ship body or a carrier of a warship, a commercial ship or a leisure and sport vessel. The hull 30 comes with a length L, a beam width B, a draft depth D and a velocity U.

Figure 5A:
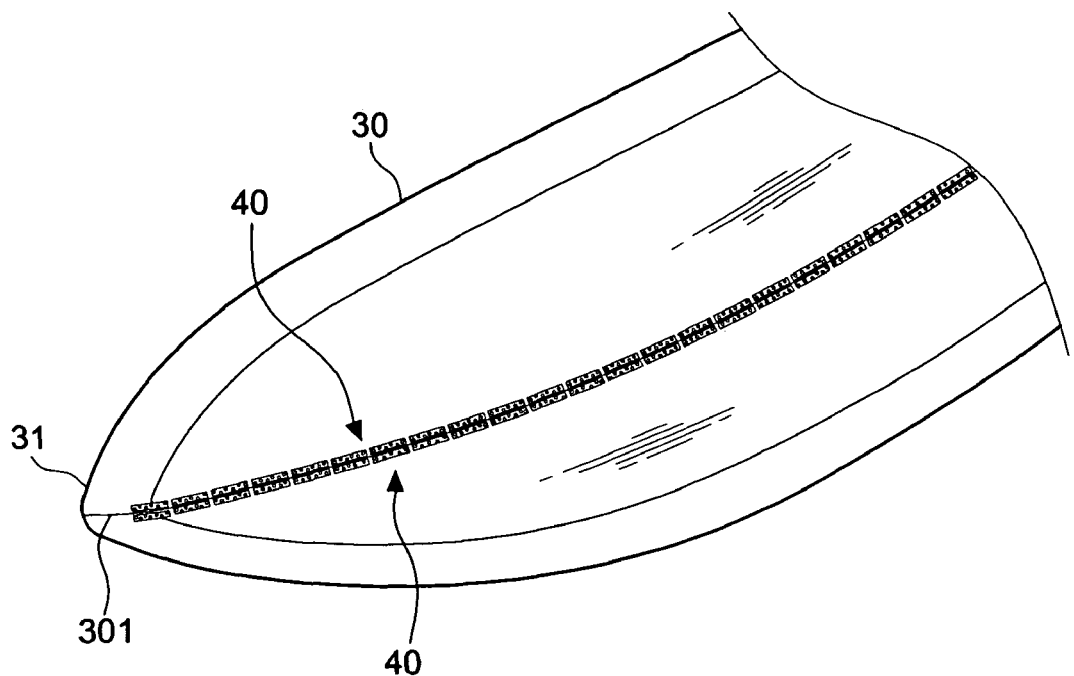
FIGS. 5A and 5B are schematic views of gas outlets on both sides of the keel line of a hull in accordance with the present invention.
Figure 5B:
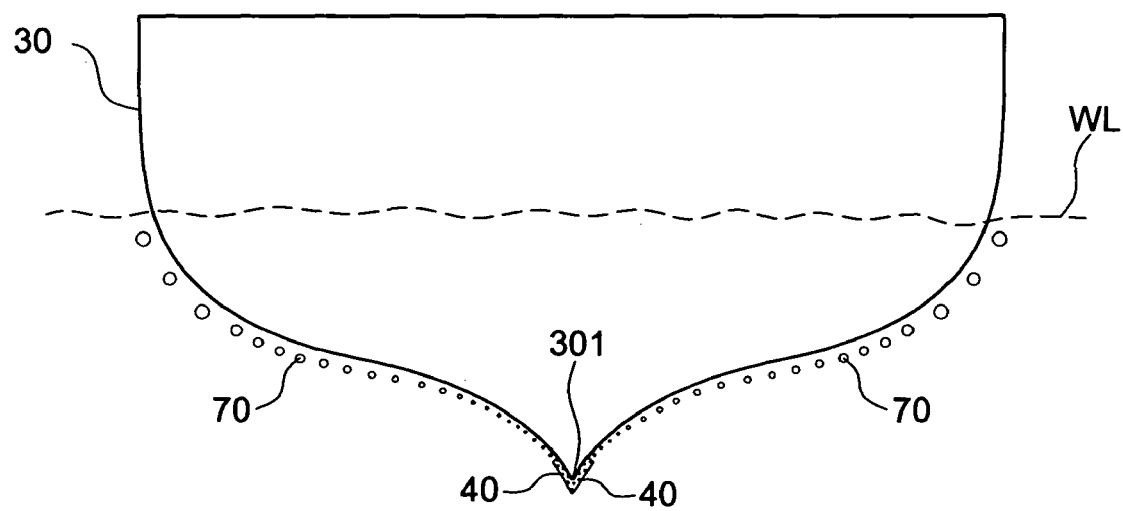
Figure 6A:
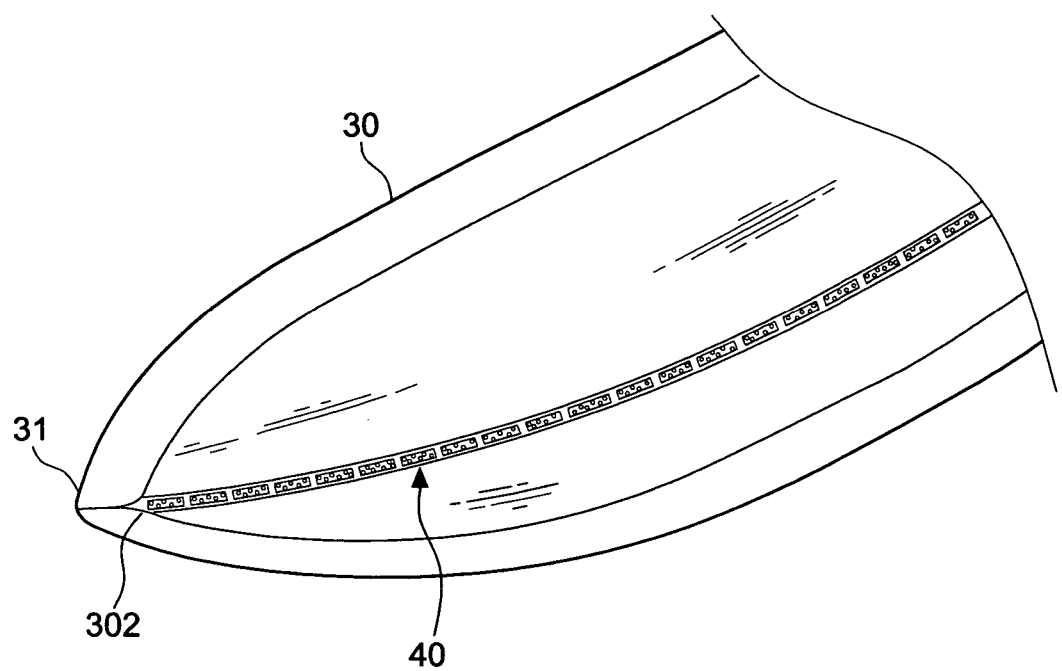
FIGS. 6A and 6B are schematic views of gas outlets at the center of a flange member disposed at the center of a flange member of a hull in accordance with the present invention.
Figure 6B:
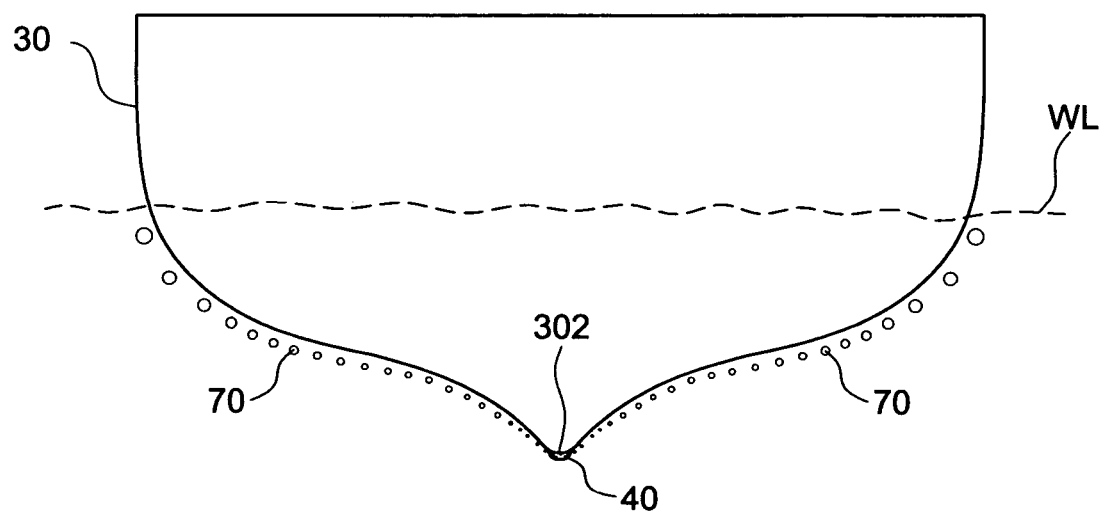
Figure 7A:
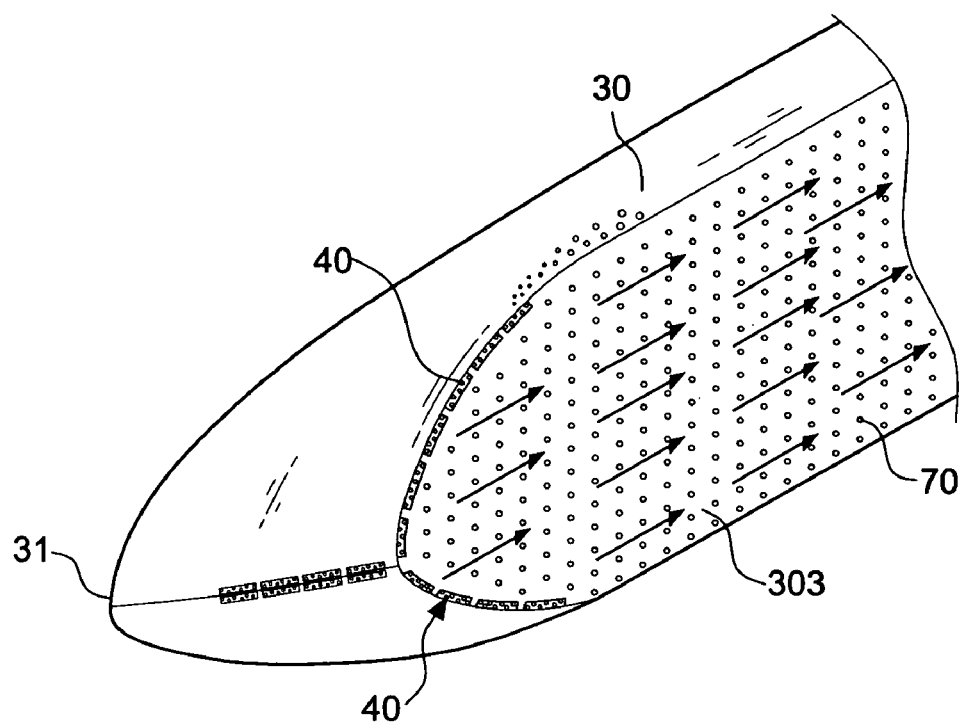
FIGS. 7A and 7B are schematic view of gas outlets disposed at the bottom of a flat-bottom board in accordance with the present invention.
Figure 7B:
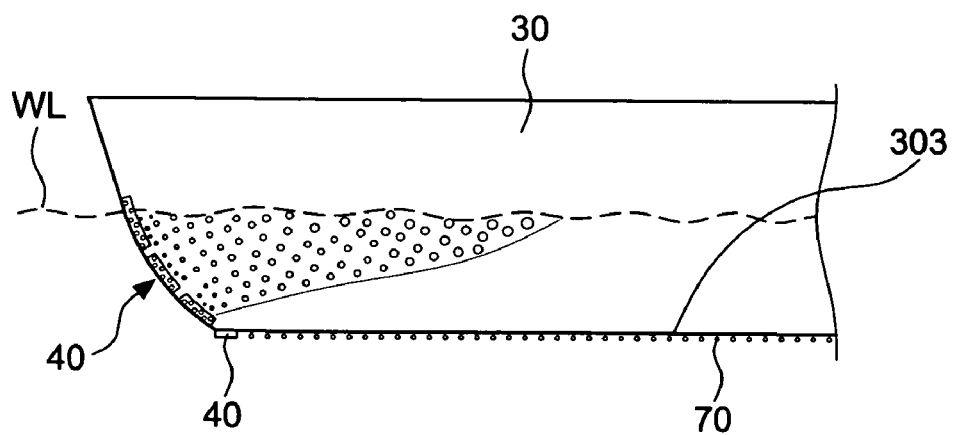

Referring to FIGS. 5A and 5B for a plurality of gas outlets 40 in accordance with a preferred embodiment of the invention, the gas outlets are disposed on two corresponding sides adjacent to the sides of a keel line 301 extended backward from a fore part 31 of the hull 30. Of course, the gas outlets 40 can also be designed at the bottom of the center of a flange member 302 extended from the fore part 31 of the hull 30 as shown in FIGS. 6A and 6B, such that the gas outlets 40 are disposed at the center position for releasing a gas from both sides. Referring to FIGS. 7A and 7B for a flat-bottomed boat, in addition to the gas outlets 40 disposed at of the fore part 31, the hull 30 further includes a plurality of gas outlets 40 arranged transversely in a row at the front side of a flat bottom 303 for releasing the gas 70 backward to form a buffer layer between the whole flat bottom 302 and the water contact surface for reducing the resistance or drag. Therefore, the gas outlets 40 can be selected according to the shape of the hull 30, but they must be below the water level WL.

Figure 8:
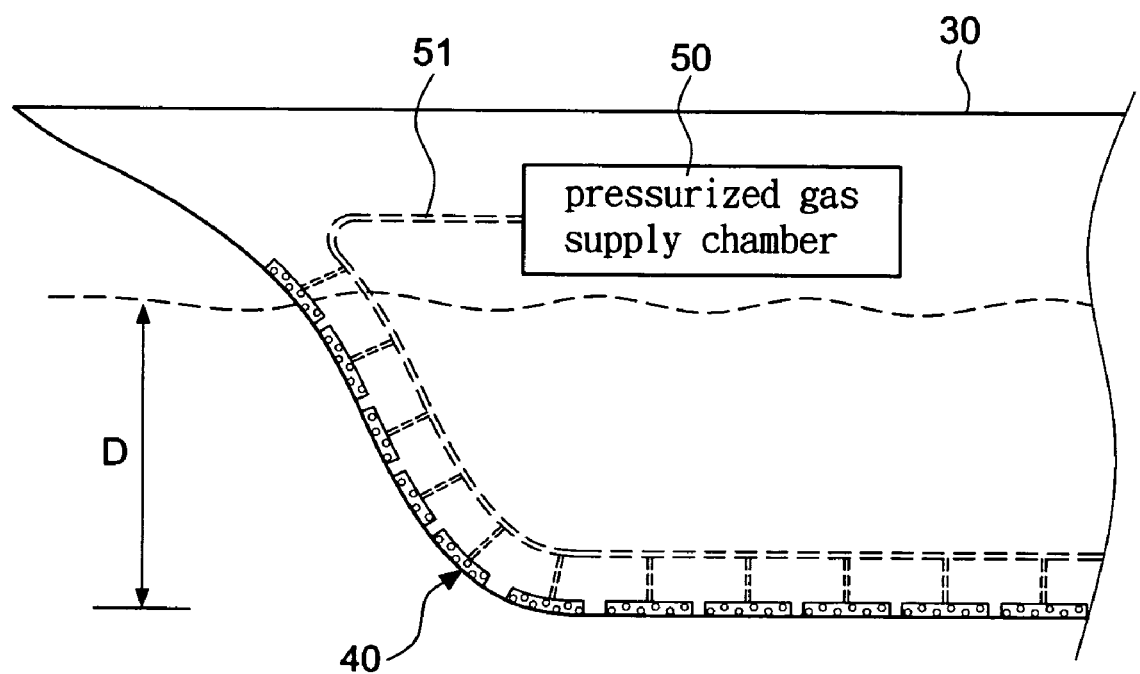
FIG. 8 is an enlarged view of a portion of a hull in accordance with the present invention.

Referring to FIG. 8 for the gas outlets 40 disposed on both sides of the hull 30 and proximate to the keel line in accordance with a preferred embodiment of the present invention, the gas outlets 40 are described in details as follows. The gas outlets 40 of the invention are formed by pipes on a surface of the hull 30, and the pipe includes a plurality of air holes which are in a circular shape or a slender shape. The gas outlets 4 formed by the pipes in these shapes have the advantage of an easy installation after being shipped out from a factory without a requirement of making any change to the hull 30. In another preferred embodiment, a plurality of gas outlets 40 are created on the surface of the hull 30 before exiting the factory.

Referring to FIG. 8, the gas outlets 40 of the invention are designed in a pressurized gas supply chamber 50 of the hull 30 for sending air or engine exhaust gas produced in the engine room to the gas outlets 40 through a pipeline 51. The gas outlets 40 can be divided into a plurality of sections, and the gas outlet 40 at each section is controlled by the pipeline 51 of the pressurized gas supply chamber 50 for releasing gases.

Figure 9:
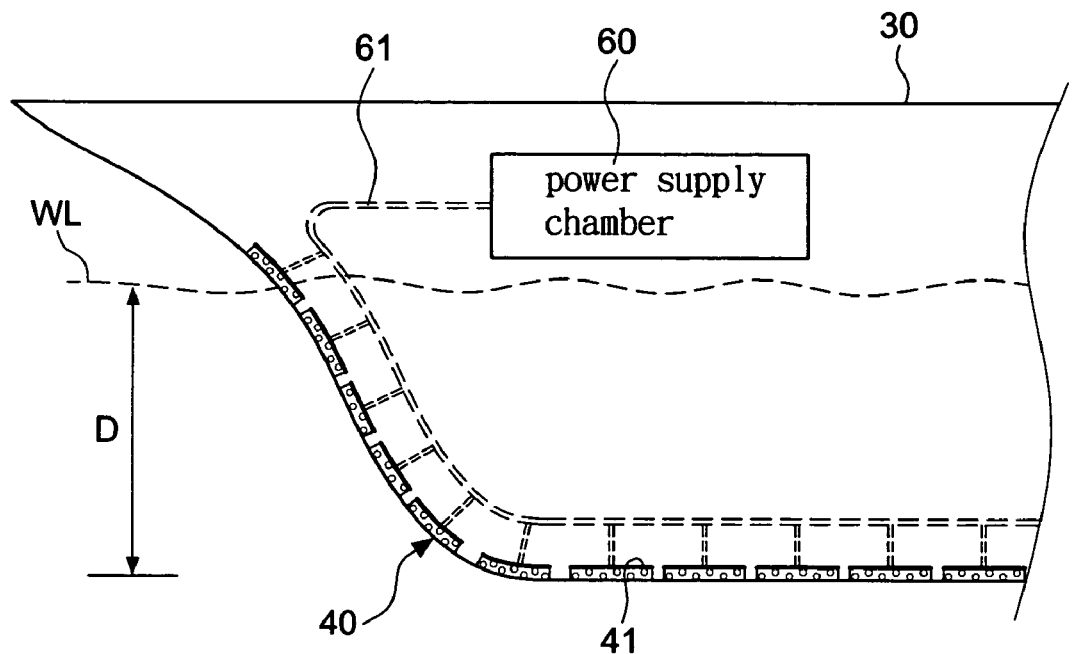
FIG. 9 is a schematic view of releasing gases in accordance with a preferred embodiment of the present invention.

In addition, the gases released from the gas outlets 40 as shown in FIG. 9 are stored in a power supply chamber 60 and an electric power is supplied to a heating device 41 at the periphery of each gas outlet 40 through an electric wire 61 for vaporizing a gas to be released, and the water vapor will forms air bubbles attached onto a surface of the hull 30 or rising to the water surface along a flow line. In this embodiment, the gas outlets 40 can be divided into a plurality of sections, and each section is controlled to be turned on or off by the power supply chamber 60.

Figure 10:
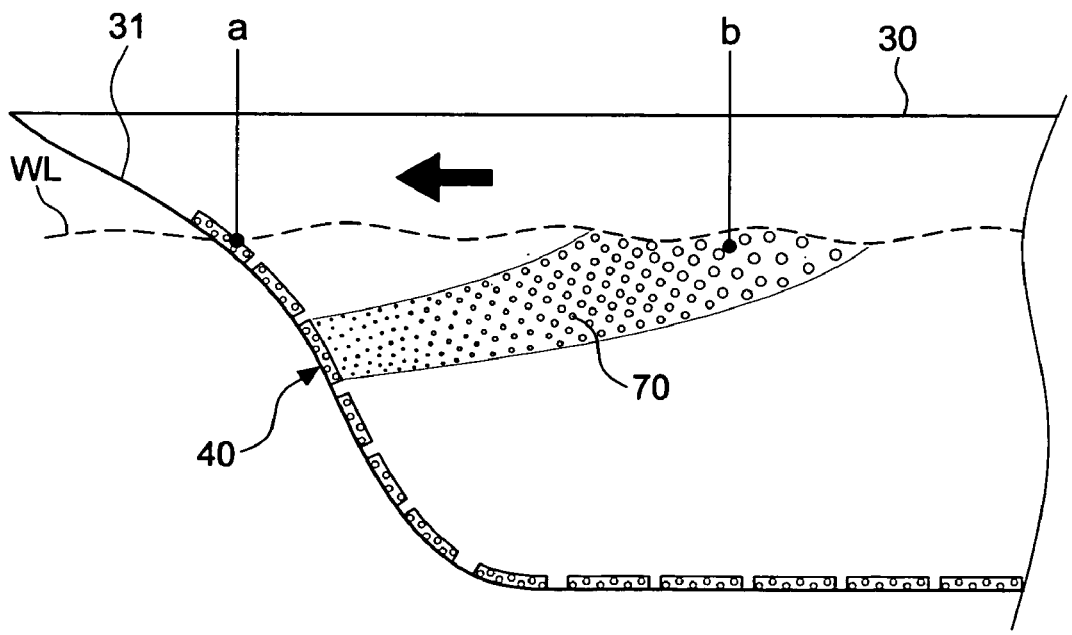
FIG. 10 is a schematic view of releasing gases in accordance with the present invention.

With the technical measures of the present invention, gases can be released from the hull 30 under the water level WL, and the gas outlets 40 can be selected according to the requirements of releasing gases. As shown in FIG. 10, when the hull 30 is traveling, a turbulence is formed at a high pressure zone which covers the fore part 31 and Point a to Point b of the water contact surface, particularly the position of Point b and a small section at a low pressure zone, so that when the hull 30 travels at a certain velocity, a large surface friction drag is formed at Point b. For this case, gas outlets 40 closer to the position of the water level WL are selected for releasing a large quantity of gases 70. If the gases 70 flow to the water level WL and precisely at Point b, the pressure of water to the hull at a high pressure zone as well as the suction of water to the hull at a low pressure zone can be reduced to eliminate two types of resistance forces simultaneously in accordance with the present invention.

Figure 11:
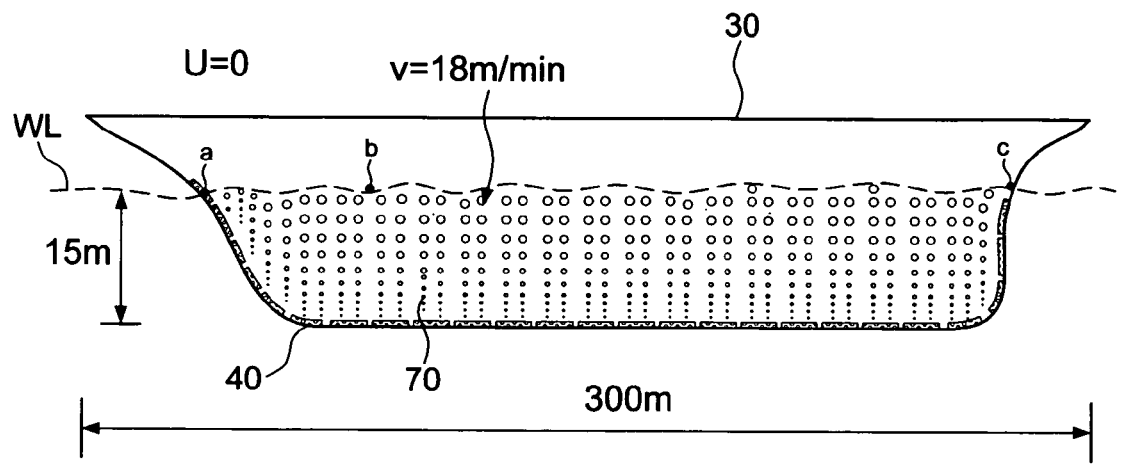
FIG. 11 is a schematic view of an application while the ship body is motionless in accordance with the present invention.

Referring to FIGS. 11 to 14 for releasing gases from the gas outlets 40 in accordance with the present invention, the hull 30 as shown in FIG. 11 is still, and thus the velocity U is 0. Now, the gases 70 released from the gas outlets 40 rises to along the surface of the hull 30 as shown in FIG. 11.

Figure 12:
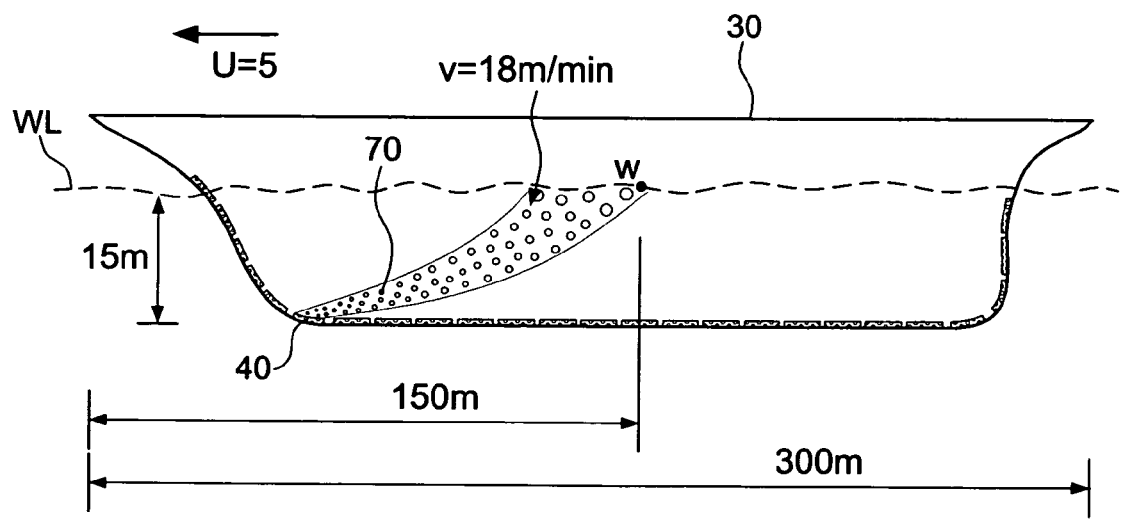
FIG. 12 is a schematic view of an application of a ship with a velocity of 5 knots in accordance with the present invention.

In FIG. 12, the hull 30 comes with a length of 300 m, a draft depth of 15 m, and a velocity of knots. Since the gases rises from a water depth of 15 at a speed approximately equal to 18 m/min, the traveling distance of the gases along a curved path of the hull is equal to 18 m. If the gases are released from the water level WL of 15 m at a position below the fore part of the hull, then the rising gases 70 can flow from a position w at the fore part which is 150 m below the water surface to the water surface along a flow line as shown in the figure.

Figure 13:
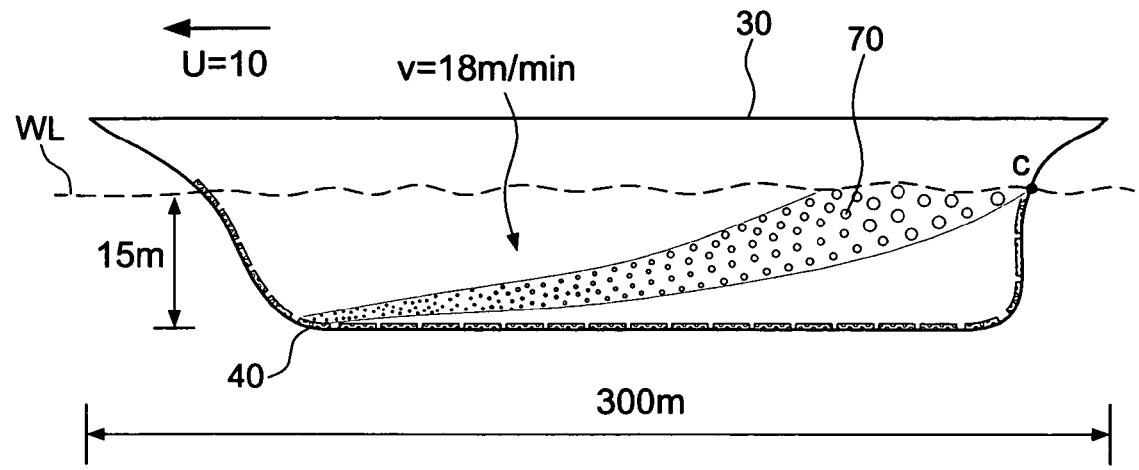
FIG. 13 is a schematic view of an application of a ship with a velocity of 10 knots in accordance with the present invention.
Figure 14:
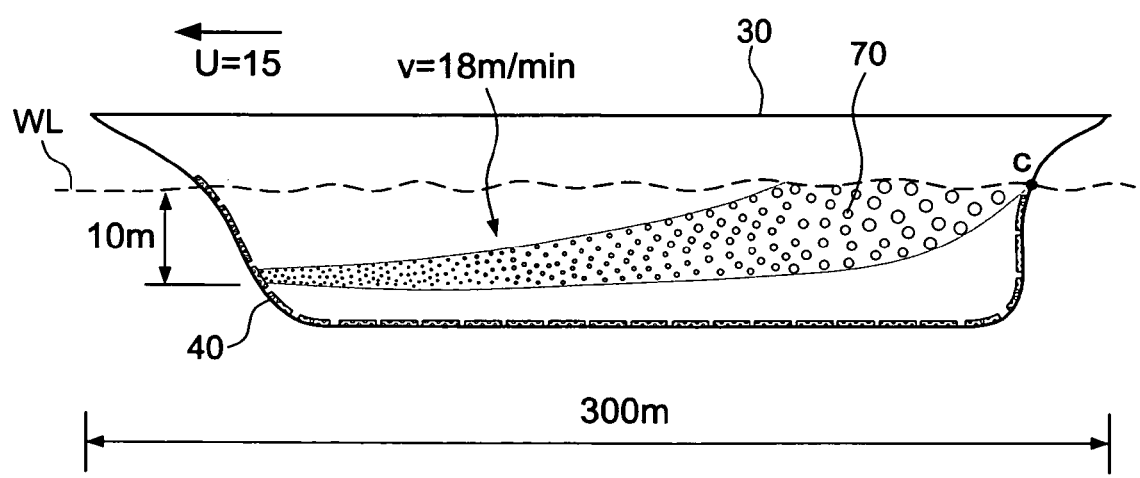
FIG. 14 is a schematic view of an application of a ship with a velocity of 5 knots in accordance with the present invention.

Referring to FIG. 13 for a hull 30 with the same size, a draft depth of 15 m, and a velocity of 10 knots (300 m/min), the gases rises at a speed of 18 m/min gases from a depth of 15 m, and thus the gases travel a distance of 18 m along the curved path of the hull, such that if the gases are released from a position at a water level WL 15 m below the fore part, then the gases 70 will flow from the position of an after part c to the water surface. Referring to FIG. 14 for a hull 30 with the same size, a draft of 10 m and a velocity of 15 knots (460 m/min), the velocity is 15 knots which is faster than the aforementioned embodiments, and thus a position at a water level of approximately 10 m below the fore part is selected for releasing the gases, then the gases 70 can flow to the water surface precisely at a position of the after part c.

The foregoing four embodiments are used for describing the methods of releasing gases, and these methods should take the parameters including the length L, the draft depth D, and the velocity U of the ship body and even the water temperature into consideration to determine the best position of releasing the gases, such that the gases can rise to the surface of the hull along the flow line, in order to optimize the functioning areas. In other words, the pressure of water to the hull 30 in a high pressure zone and the suction of water to the hull in a low pressure zone can be reduced to simultaneously reduce the pressure and suction while the ship is traveling, and thus the invention can enhance the efficiency effectively.

In other words, the gas outlets disclosed above are provided for releasing gases from the bottom of the ship to reduce the friction drag of water to the hull 30, so that the ship can travel faster with the same horse power or travel at an expected velocity without using as much horse power or driving forces. Therefore, the invention can save tremendous amounts of fuel costs and carbon dioxide emissions, and provide a positive economic benefit and an environmental protection function in the era of energy shortage.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A method of reducing frictional resistance between a ship body and water by releasing gases in water, comprising the steps of:
   (a) providing a plurality of gas outlets disposed at predetermined positions under a water level of a fore part of a hull of the ship body for releasing the gases;
   (b) using the effect of gases released vertically upward in the water and along an aslant wall of the hull to partially separate the hull from a water contact surface, so as to lower the average density of water at the contact surface with the hull;
   (c) selecting the position of releasing the gases according to parameters including the shape of the hull, the velocity, the draft depth and the water temperature, such that the released gases are attached onto the surface of the hull and floated to predetermined positions of the water surface through predetermined flow lines;
   (d) using the compressibility of the gases and the gases released in a high pressure zone and a low pressure zone as a buffer layer to reduce the pressure of water to the hull in the high pressure zone and reduce the suction to the hull in the low pressure zone, for simultaneously reducing the pressure and the suction produced during the traveling of the ship body, wherein the released gases are selected from a group of air, engine exhaust gas and water vapor; and
   (e) providing a heating device in each section at a periphery of each gas outlet, the heating device being supplied with electric power for producing the water vapor, wherein the water vapor is included in a power supply chamber of the hull and wherein each section is controlled to be turned on or off by the power supply chamber.

2. The method of reducing frictional resistance between a ship body and water by releasing gases in water as recited in claim 1, wherein the air and the engine exhaust gas are included in pressurized gas supply chamber in the hull and sent to the gas outlets through a pipeline.

3. The method of reducing frictional resistance between a ship body and water by releasing gases in water as recited in claim 2, wherein the gas outlets are disposed at a plurality of sections respectively, and the gas outlet of each section is controlled to be turned on or off by the pressurized gas supply chamber.

4. The method of reducing frictional resistance between a ship body and water by releasing gases in water as recited in claim 1, wherein the electric power is supplied to the heating device through an electric wire.

5. The method of reducing frictional resistance between a ship body and water by releasing gases in water as recited in claim 1, wherein the ship body comes with a shape selected from the collection of a warship, a merchant ship, and a leisure and sport vessel.

* * * * *